United States Patent
Ohnishi et al.

(10) Patent No.: US 6,349,261 B1
(45) Date of Patent: Feb. 19, 2002

(54) METHOD AND APPARATUS FOR DETERMINING ROUTE WITHIN TRAFFIC NETWORK

(75) Inventors: Keisuke Ohnishi, Tokyo; Shin Kikuchi, Musashino, both of (JP)

(73) Assignee: Navitime Japan Co., Ltd., Tokyo (JP)

( * ) Notice: Subject to any disclaimer, the term of this patent is extended or adjusted under 35 U.S.C. 154(b) by 0 days.

(21) Appl. No.: 09/520,219

(22) Filed: Mar. 7, 2000

(30) Foreign Application Priority Data

Mar. 8, 1999 (JP) .......................................... 11-060407

(51) Int. Cl.$^7$ ............................ G01C 21/00; G06G 7/78
(52) U.S. Cl. ...................... 701/209; 701/202; 701/208; 340/995
(58) Field of Search ................................. 701/202, 209, 701/207, 212, 200, 201, 211, 210, 26, 208; 340/955, 988

(56) References Cited

U.S. PATENT DOCUMENTS

| | | | |
|---|---|---|---|
| 5,475,598 A | * 12/1995 | Fushimi et al. | 364/444 |
| 5,899,955 A | * 5/1999 | Yagyu et al. | 701/209 |
| 5,910,177 A | * 6/1999 | Zuber | 701/202 |
| 5,963,948 A | * 10/1999 | Shilcrat | 707/100 |
| 5,978,732 A | * 11/1999 | Kakitani et al. | 701/209 |
| 6,023,653 A | * 2/2000 | Ichimura et al. | 701/208 |
| 6,029,112 A | * 2/2000 | Nam et al. | 701/209 |
| 6,038,507 A | * 3/2000 | Miyano | 701/202 |
| 6,038,509 A | * 3/2000 | Poppen et al. | 701/210 |
| 6,119,065 A | * 9/2000 | Shimada et al. | 701/201 |

* cited by examiner

*Primary Examiner*—Tan Nguyen
*Assistant Examiner*—Dalena Tran
(74) *Attorney, Agent, or Firm*—Oblon, Spivak, McClelland, Maier & Neustadt, P.C.

(57) ABSTRACT

A method of determining, by use of a computer, a minimum-cost route from a start location to a target location within a traffic network in accordance with a label determination method, in which traffic network locations are represented as nodes and a route between adjacent nodes is represented as a link. The method comprises (1) choosing at least one entrance station of a transportation network to be used whose straight-line distance as measured from the start location falls within a predetermined range and at least one exit station of the transportation network whose straight-line distance as measured from the target location falls within the predetermined range, and estimating cost of a walking route from the start location to the entrance station and cost of a walking route from the exit station to the target location, on the basis of the respective straight-line distances, each calculated by use of latitude/longitude data; and (2) incorporating, as links, the walking routes having estimated costs into a traffic network comprising the transportation network in order to express a comprehensive traffic network to thereby enable the computer to determine a route under desired cost conditions in accordance with the label determination method.

12 Claims, 8 Drawing Sheets

LINK TABLE

| LINK | START NODE | END NODE |
|------|------------|----------|
| 1    | $N_{S1}$   | $N_{E1}$ |
| 2    | $N_{S2}$   | $N_{E2}$ |
| 3    | $N_{S3}$   | $N_{E3}$ |
| ⋮    | ⋮          | ⋮        |
| i    | $N_{Si}$   | $N_{E4}$ |
| ⋮    | ⋮          | ⋮        |
| n    | $N_{Sn}$   | $N_{E5}$ |

ROAD NETWORK

FIG.8

METHOD AND APPARATUS FOR DETERMINING ROUTE WITHIN TRAFFIC NETWORK

BACKGROUND OF THE INVENTION

1. Field of the Invention

The present invention relates to a computer system for determining a minimum-cost route from a start location to a target location between which a person travels by walking and using a transportation network, such as a public transportation network.

2. Description of the Related Art

An optimal route is difficult to determine in a complicated traffic network. Further, optimization must be effected in consideration of various factors such as time and cost. Theoretically, a computer can determine an optimal route through calculation performed for all possible combinations. However, when the traffic network becomes complicated, calculation time Increases drastically, even when a high-performance computer is used, so that calculation becomes impossible to complete.

In order to avoid such a problem of calculation becoming impossible to complete, various methods have been proposed. A label determination method—which is used in a computer to determine a shortest route within a traffic network—reduces computer processing time and provides a quick solution. The label determination method is sometimes called the Dijkstra method, after its inventor. Japanese Patent Application Laid-Open (kokai) Nos. 10-275296 (Navigation Method and System), 10-253376 (Method and System for Determining a Minimum-Cost Route), and 11-44547 (Method and System for Determining a Minimum-Cost Route) each disclose a method of determining a route in a traffic network by use of the label determination method.

Figure 1:
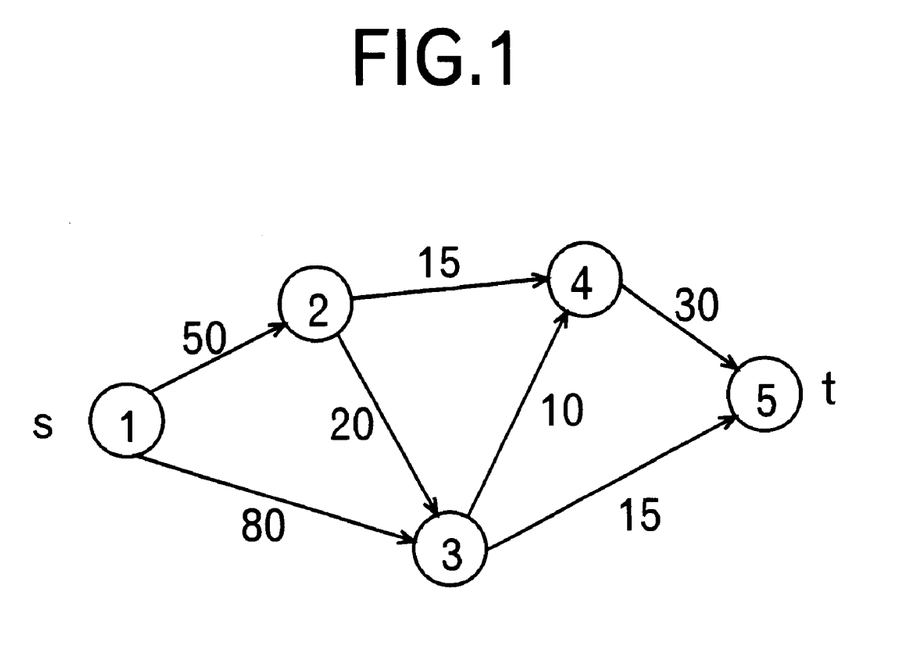
FIG. 1 is a network diagram specifically showing a method for obtaining an optimum solution by use of a conventional label determination method.

An exemplary system which is represented by means of a network as shown in FIG. 1 will be described. Each of black circles in FIG. 1 corresponds to a specific location and is called a "node." A line connecting adjacent nodes corresponding to respective locations is called a "link." Mathematically, a set including the nodes and links is called a "graph." When the links have orientation, the graph is called a "directed graph," and when the links have no orientation, the graph is called an "undirected graph." FIG. 1 shows an exemplary directed graph. A shortest route problem is a problem of finding a shortest route among routes between a start location node s to a target location node t within a network such as the above-described network.

Here, a shortest route P from node s to node t is represented as follows.

P={s, i, J, . . . , k, t}

In this case, when the route P is divided at a certain node into routes P1 and P2, each of the routes P1 and P2 represents the shortest route within a corresponding set. This is called the principle of optimality. The label determination method is an algorithm for mathematically determining the shortest route by use of the principle. That is, the label determination method starts with an empty set. Each node is labeled with a temporary label, and nodes which constitute the shortest route are determined node-by-node in order to expand a shortest-route subset. Finally, all the nodes are labeled with permanent labels. Thus, the shortest route is determined. The following is an algorithm used for programming computers.

When a set of all nodes present between node s and node t is represented by V, the length of the shortest route from node s to node j is represented by d(j), a set of nodes for the shortest route (hereinafter referred to as a "shortest route node set") is represented by S1, and its complementary set is represented by S2 (=V−S), the shortest route is determined as follows.

(1) The following initialization is performed.

S1←0 (empty set), S2←V, d(s)←0, d(i)←∞

Here, i represents a node in the complementary set S2, and X←Y represents an operation of replacing X with Y.

(2) If S1=V, then calculation is ended.

(3) If S1≠V, then the shortest route length d(i) is selected, and replacement v←i is effected.

Since the length d(v) represents the length of the shortest route from node s to node v, node v is included in the shortest route node set S1, and is excluded from the complementary set S2.

(4) For each node i which is contained in the complementary set S2 and to which a link extending from node V (outgoing link) reaches next, the following calculation is performed.

d'(i)←d(v)+avi

If d(i)>d'(i), then d(i)←d'(i) and p(i)←v.

Here, avi represents the length of a link from node v to node i, and d(i) and d'(i) each represent the length of a route from the start location s to node i. The value d(i) at this point represents the shortest route length which is formed by nodes within the shortest route node set S1. There is a possibility that the complementary set S2 includes a node that provides a shorter route. However, such a shorter route would be found during repeated calculation.

(5) Processing returns to step (2) above.

When the thus-obtained p(i) is followed in reverse order from the final node t on the basis of p(t), the shortest route from the start node s is obtained. For example, when the above-described algorithm is applied to the example shown in FIG. 1, the following is obtained.

| d(1) = 0 | d(2) = 50 | d(3) = 70 | d(4) = 65 | d(5) = 85 |
|---|---|---|---|---|
| | p(2) = 1 | p(3) = 2 | p(4) = 2 | p(5) = 3 |

Since s=1 and t=5, node 3 is determined to precede node 5, because p(5)=3; node 2 is determined to precede node 3, because p(3)=2; and node 1 is determined to precede node 2, because p(2)=1, so that the start location s is reached. That is, the shortest route is 1→2→3→5, and the length thereof is 85 (=d(5)). Further, the route (1→2→4) from node 1 to node 4 also has a short route length d(4).

When determination of the route of FIG. 1 is actually simulated by use of the above-described algorithm, it is found that calculation of the length d'(4) from node 3 to node 4 is not required. That is, the label determination method involves a drastic reduction in the amount of calculation as compared with a case in which the shortest route is calculated through use of all combinations.

The above-described label determination method can be applied to determination of a route from a certain station to a target station within a public transportation network. In this case, the shortest route is determined in consideration of not only distance but also time and fare, which are generally referred to as cost.

The label determination method realizes high-speed processing when performed by use of a computer. Especially, when a start location and a target location are predetermined, the label determination method starts route determination from the start location in order to successively find nodes that minimize cost, and determines the route that reaches the target location with minimum cost. The cost to be considered is time or distance, and therefore, "travel time" or "travel distance" is evaluated.

In many navigation systems manufactured to date, the label determination method is frequently used when route determination is performed with an objective of attaining to minimum cost. Examples of such minimum-cost-route determination include a system for determining a minimum-cost route in a railroad network and a system for determining a minimum-cost route in a road network.

However, no conventional navigation system can determine a route along which a person travels by walking and using a transportation network. For example, a navigation system designed for a railroad network does not take into consideration a station to which a person walks from a start location (a station where the person enters the railroad network, hereinafter called an "entrance station") or how long the person takes to reach a target location from a station where the person exits the railroad network (hereinafter called an "exit station"). Therefore, such a navigation system starts route determination after a person designates the station closest to the start location and the station closet to the target location. Therefore, the navigation system cannot guarantee that the determined route including sections in which the person walks minimizes cost, although the system can properly determine a minimum-cost route from the entrance station to the exit station, both designated by the person.

SUMMARY OF THE INVENTION

In view of the foregoing, an object of the present invention is to provide a system which is suitable for cases in which a person walks to an entrance station of a transportation network to be used and walks again from an exit station to a target location and which, upon the person designating the target location, can determine a minimum-cost route including sections along which the person walks.

In order to achieve the above object, the present invention provides a method of determining, by use of a computer, a minimum-cost route from a start location to a target location within a traffic network in accordance with a label determination method, in which traffic network locations are represented as nodes and a route between adjacent nodes is represented as a link. The method comprises:

(1) choosing at least one entrance station of a transportation network to be used whose straight-line distance as measured from the start location falls within a predetermined range and at least one exit station of the transportation network whose straight-line distance as measured from the target location falls within the predetermined range, and estimating cost of a walking route from the start location to the entrance station and cost of a walking route from the exit station to the target location, on the basis of the respective straight-line distances, each calculated by use of latitude/longitude data; and (2) incorporating, as links, the walking routes having estimated costs into a traffic network comprising the transportation network in order to express a comprehensive traffic network to thereby enable the computer to determine a route under desired cost conditions in accordance with the label determination method.

Further, there may be employed the following method which differs from the above-described method in the manner of determining a walking route.

The Method Comprises:

(1) calculating cost of a walking route from the start location to at least one entrance station of a transportation network to be used and cost of a walking route from at least one exit station of the transportation network to the target location, the cost involved in each of the walking routes falling within a designated cost range, and the walking routes being determined by a label determination method which utilizes a road network created from map data including latitude/longitude information and which determines the walking routes under desired cost conditions; and (2) incorporating, as links, the walking routes having calculated costs into a traffic network comprising the transportation network in order to express a comprehensive traffic network to thereby enable the computer to determine a route under desired cost conditions in accordance with the label determination method.

Next, a first aspect of the invention will be described. A computer is operated in order to determine a minimum-cost route from a start location to a target location between which a person walks from the start location to an entrance point (a station in the case of a railroad network) of a transportation network, uses the transportation network to an exit point (a station in the case of a railroad network) of the transportation network, and walks from the exit point of the transportation network to the target location.

First, Overall Processing will be Described.

(1) At least one entrance station of a transportation network to be used whose straight-line distance as measured from the start location falls within a predetermined range and at least one exit station of the transportation network whose straight-line distance as measured from the target location falls within the predetermined range are chosen. Cost of a walking route from the start location to the entrance station and cost of a walking route from the exit station to the target location are estimated on the basis of the straight-line distance between the start location and the entrance station and the straight-line distance between the exit station and the target location, respectively. The walking routes having estimated costs are incorporated, as links, into a traffic network comprising the transportation network. The above-described calculation will be referred to as a "straight-line-distance-basis walking cost calculation."

(2) The traffic network is expressed, such that locations are represented as nodes, and a route between adjacent nodes is represented as a link. There is introduced a label consisting of the name of a link connecting the start node and a specific node and a cumulative cost from the start node to the specific node. During initial value setting, the start node is labeled with a temporary label $(*, 0)$, and each of the remaining nodes is labeled with a temporary label $(\Phi, \infty)$, where "*" means that no link reaches the start node, "$\Phi$" means that no link has yet reached the corresponding node, and "$\infty$" means a numerical value which is sufficiently large within the context of a relevant problem.

(3) Among nodes bearing temporary labels, a node having the lowest potential (i.e., cumulative cost) is selected. When the selected node is the target location, the route determination is ended, and the end processing routine described in (5) below is performed. When the selected node is not the target location, the processing routine described in (4) is performed successively.

(4) The potential of an end node which is linked from the node having the lowest potential and which has a temporary label is calculated. When the thus-calculated potential of the end node is lower than the potential indicated by the temporary label of the end node, the potential indicated by the temporary label of the end node is replaced with the calculated potential of the end node. The temporary label of the node having the lowest potential is rendered permanent, and the processing routine described in (3) above is executed.

(5) Permanent labels are followed backward from the target location to the start location in order to determine a route of lowest potential, including walking routes.

Next, "straight-line-distance-basis walking cost calculation" for estimating walking cost on the basis of straight-line distance will be described. The straight-line distance from the start location to an entrance point of a transportation network to be used and the straight-line distance from an exit point of the transportation network to the target location are calculated by use of the following equations.

$$\cos \xi = \sin \phi_1 \cdot \sin \phi_2 + \cos \phi_1 \cdot \cos \phi_2 \cdot (\cos(\lambda_1 - \lambda_2)) \quad (1)$$

$$S = R \cdot \xi \quad (2)$$

Here, S is a straight-line distance between two locations A and B; R is a radius of curvature of the earth in the vicinity of Japan (approximately 6370 km); $\xi$ is an angle between a line extending from the center of an arc A B to the location A and a line extending from the center to the location B; $\lambda_1$ and $\phi_1$ are the latitude and longitude, respectively, of the location A; and $\lambda_2$ and $\phi_2$ are the latitude and longitude, respectively of the location B. The latitude and longitude of each location can be obtained from map data containing latitude/longitude information. The latitude and longitude of the present location can be obtained by use of a GPS receiver. Means such as a GPS receiver is especially effective when the start location is unknown to the person, because the person is walking in an unfamiliar area. In the present invention, the walking distance between the location A and B is treated as being proportional to the straight-line distance therebetween. Therefore, when cost is time, each of a required time from the start location to the closest entrance point of the transportation network and a required time from the exit point of the transportation network to the target location can be calculated through division of the corresponding straight-line distance by an average walking speed. The thus-obtained cost is incorporated in the traffic network to be used.

A maximum cost is designated in advance in relation to the required time from the start location to an entrance point of the transportation network and the required time from an exit point of the transportation network to the target location, and an entrance point(s) and an exit point(s) of the transportation network are selected such that the walking cost does not exceed the maximum cost. When a plurality of entrance points or exit points are selected, a plurality of links are formed between the start location to the respective entrance points of the transportation network and/or between the exit points of the transportation network and the target location.

After the links in the walking sections are incorporated into the traffic network, the following route determination processing is performed for the traffic network.

(1) The traffic network is expressed, such that locations are represented as nodes, and a route between adjacent nodes is represented as a link. There is introduced a label consisting of the name of a link connecting the start node and a specific node and a cumulative cost from the start node to the specific node. During initial value setting, the start node is labeled with a temporary label (*, 0), and each of the remaining nodes is labeled with a temporary label (Φ, ∞), where "*" means that no link reaches the start node, "Φ" means that no link has yet reached the corresponding node, and "∞" means a numerical value which is sufficiently large within the context of a relevant problem.

(2) Among nodes bearing temporary labels, a node having the lowest potential (i.e., cumulative cost) is selected. When the selected node is the target location, the route determination is ended, and the end processing routine described in (4) below is performed. When the selected node is not the target location, the processing routine described in (3) is performed successively.

(3) The potential of an end node which is linked from the node having the lowest potential and which has a temporary label is calculated. When the thus-calculated potential of the end node is lower than the potential indicated by the temporary label of the end node, the potential value in the temporary label of the end node is replaced with the calculated potential value of the end node. The temporary label of the node having the lowest potential is rendered permanent, and the processing routine described in (2) above is executed.

(4) Permanent labels are followed backward from the target location to the start location in order to determine a route of lowest potential, including walking routes.

In the specification, the above-described label determination method will be referred to as a "potential-basis label determination method," in order to distinguish it from the conventional label determination method.

Next, a second aspect of the present invention will be described.

A computer is operated in order to determine a minimum-cost route from a start location to a target location between which a person walks from the start location to an entrance point (a station in the case of a railroad network) of a transportation network, uses the transportation network to an exit point (a station in the case of a railroad network) of the transportation network, and walks from the exit point of the transportation network to the target location. The method comprises the following steps:

(1) At least one entrance point of a transportation network to be used which incurs a cost within a predetermined range and at least one exit point of the transportation network which incurs a cost within the predetermined range are chosen. The cost of the route from the start location to the entrance point and the cost of the route from the exit point of the transportation network to the target location are calculated from a road map. The walking routes having calculated costs are incorporated, as links, into a traffic network comprising the transportation network. The above-described calculation will be referred to as a "road-map-basis walking cost calculation."

(2) The traffic network is expressed, such that locations are represented as nodes, and a route between adjacent nodes is represented as a link. There is introduced a label consisting of the name of a link connecting the start node and a specific node and a cumulative cost from the start node to the specific node. During initial value setting, the start node is labeled with a temporary label (*, 0), and each of the remaining nodes is labeled with a temporary label (Φ, ∞), where "*" means that no link reaches the start node, "Φ" means that no link has yet reached the corresponding node, and "∞" means a numerical value which is sufficiently large within the context of a relevant problem.

(3) Among nodes bearing temporary labels, a node having the lowest potential (i.e., cumulative cost) is selected. When the selected node is the target location, the route determination is ended, and the end processing routine described in (5) below is performed. When the selected node is not the target location, the processing routine described in (4) is performed successively.

(4) The potential of an end node which is linked from the node having the lowest potential and which has a temporary label is calculated. When the thus-calculated potential of the end node is lower than the potential indicated by the temporary label of the end node, the potential value in the temporary label of the end node is replaced with the calculated potential value of the end node. The temporary label of the node having the lowest potential is rendered permanent, and the processing routine described in (3) above is executed.

(5) Permanent labels are followed backward from the target location to the start location in order to determine a route of lowest potential, including walking routes.

In the first aspect of the present invention, the cost of a route from the start location to each entrance point of a transportation network to be used and the cost of a route from each exit point of the transportation network to the target location are each calculated on the basis of the corresponding straight-line distance. By contrast, in the second aspect of the invention, these costs are calculated accurately by use of a road map. When entrance and exits stations whose cost, calculated by the "road-map-basis walking cost calculation," falls within a designated cost range are searched, a walking route from the start location to the entrance station and a walking route from the exit station to the target location are incorporated in the traffic network as links.

In the "road-map-basis walking cost calculation," the same "potential-basis label determination method" as used in the first aspect is used. Since the network used here is a road network, the "potential-basis label determination method" is used after some modifications.

By use of the "potential-basis label determination method," a minimum-cost route is determined for the traffic network into which the links obtained through the "road-map-basis walking cost calculation" have been incorporated.

Next, the "potential-basis label determination method" will be described more specifically. In the potential-basis label determination method, the potential of each node is introduced into a corresponding label. A label for each node is defined as follows:

(1, p(v))

where 1 represents a link connecting adjacent nodes, v represents a node currently under consideration, and p(v) is the potential of node v. The potential p(v) represents a cumulative cost involved in a route from the start point to node v.

A route from the start location (start node) to a target location (target node) can be determined under the condition of minimizing cost.

[Process for Setting Initial Values]

The start node s is labeled with a temporary label (*, 0), and each of the remaining nodes is labeled with a temporary label ($\Phi$, $\infty$), where "*" means that no link has yet reached the start node, "$\Phi$" means that no link has yet reached the corresponding node, and "$\infty$" means a numerical value sufficiently large within the context of a relevant problem.

[Process for Searching a Lowest Potential Node]

Among nodes bearing temporary labels, a node having the lowest potential is searched, and is referred to as the lowest-potential node v. When the node searched here is the target node (target location), the node is labeled with a permanent label, and the processing proceeds to "End process." In other cases, the processing proceeds to "Route determination process."

[Route Determination Process]

When a node connected to link a (outgoing link a) extending from node v is represented by $\delta-1a$, and the potential accumulated from the start node is represented by p(V), the potential of node $\delta-1a$ is represented by p(v)+d(a).

When p(v)+d(a) is smaller than p($\delta-1a$) which is already set for node $\delta-1a$, p(v)+d(a) is used as the new potential p($\delta-1a$), and the node is labeled with a temporary label (a, p($\delta-1a$).

After the above-described processing is performed for all the links (outgoing links) extending from node v, the temporary label of node v is rendered permanent. Subsequently, the processing returns to the "Process for searching a lowest potential node."

[End Process]

Nodes which are obtained by the above-described processing and which each have a permanent label are output in a demanded form.

Figure 2:
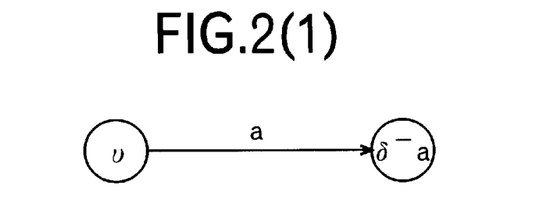
FIG. 2 is a diagram in relation to an embodiment of the present invention, showing nodes, links, potentials, and their reference symbols.

Next, the present invention will be described in more detail. FIG. 2 shows the relationship between nodes and links. Symbols used here have the following meanings.

v: node having the lowest potential among nodes bearing temporary labels;

u: node adjacent to node v;

a, b: links;

$\delta-1a$: node which link a reaches;

$\delta+1a$: node from which link a extends;

d(a): cost involved in reaching link a; and p(v): potential of node v (indicating cumulative cost from the start location (=$\Sigma d(ai)$)).

As viewed from node v, a is an outgoing link, and b is an incoming link. As viewed from node u, a is an incoming link, and b is an outgoing link. d(a) is cost, such as time, distance, or money, which is incurred for using link a. Results to be obtained vary depending on the type of cost. Although generally d(a)=d(b) in a case as shown in FIG. 2(3), in some cases d(a)$\neq$d(b). Potential p(v) is a sum of costs accumulated along a route from the start location 0 to node v.

A label of node u (same as $\delta-1a$, $\delta+1a$) connected to node v via link a is defined as (a, p(v)+d(a)) or u (a, p(v)+d(a)).

Since p(v)+d(a) is p(u), the above label can be written as (a, p(u)) or u(a, p(u)).

That is, the label of node u is represented by link a connecting node u to node v, and a cumulative potential up to node u. A label which may be changed in the future is referred to as a "temporary label," and a label which will never be changed in the future is referred to as a "permanent label." That is, a permanent label for node u includes a lowest value of potential accumulated up to node u, because, in the present invention, a route starting from the start node is always determined, while nodes each having the lowest potential are selected. This concept will next be described.

Figure 3:
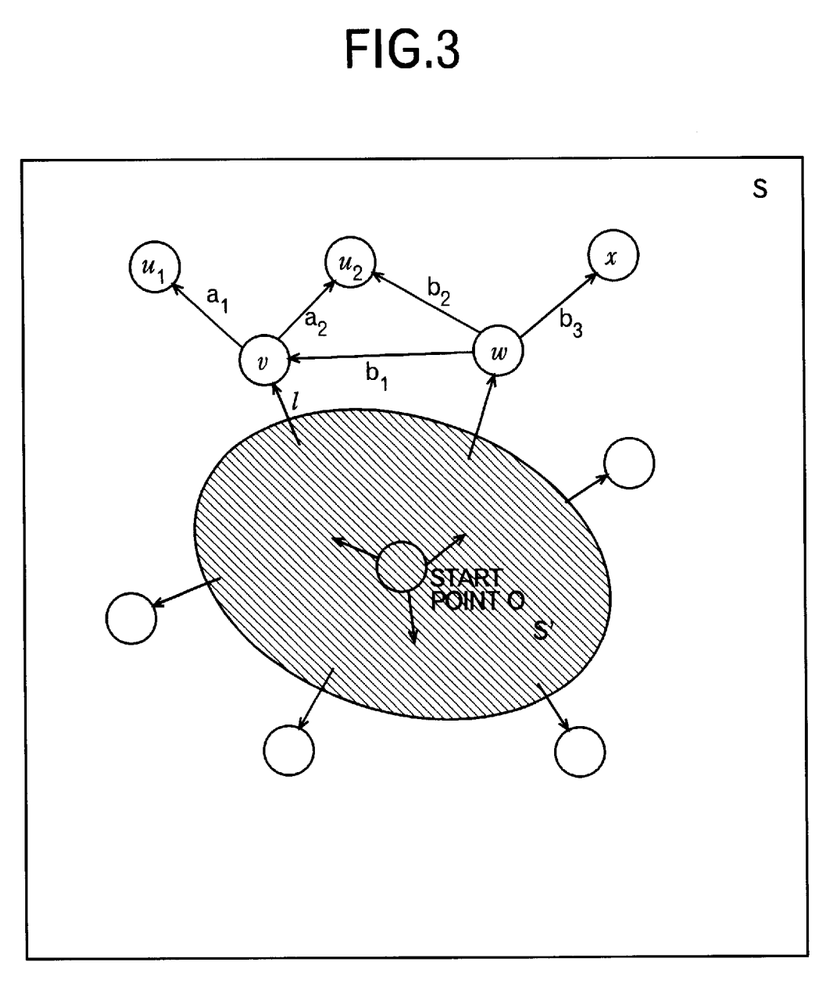
FIG. 3 is a diagram in relation to the embodiment of the present invention, showing nodes bearing temporary labels and node bearing permanent labels.

Introduction of the concept of node potential simplifies program description and enables judgment as to whether processing is to end. As described above, the present invention utilizes the label determination method for route determination. FIG. 3 shows a set S of all nodes, as well as a set S' (hatched portion) of nodes bearing permanent labels. In order to find a route of lowest potential, a node bearing a label whose potential value is lowest is searched from nodes bearing temporary labels (=S–S'). Here, only outgoing links are considered, and it is assumed that the thus-searched node is node v. When nodes u1 and u2 are adjacent to node v, nodes u1 and u2 are labeled with temporary labels as follows (here, each of nodes u1 and u2 is assumed to be a node which has not yet been searched:

u1: (a1, p(v)+d(a1))

u2: (a2, p(v)+d(a2))

Subsequently, the temporary label (1, p(v)) of node v is rendered permanent, and node v is incorporated into the set S' of nodes bearing permanent labels. That the potential p(v) indicated by the label (1, p(v)) is the lowest can be proved as follows.

Suppose that node w is found next during the searching operation for searching a temporary label having the lowest potential value, and that node w is connected to adjacent nodes v, u2, and x via links b1, b2, and b3, respectively. In this case, temporary labels for nodes v, u2, and x are determined as follows:

v: (b1, p(w)+d(b1))

u2: (b2, p(w)+d(b2))

x: (b3, p(w)+d(b3))

The potential p(v) of node v indicated by the label (1, p(v)) rendered permanent satisfies the following relationship.

p(v)≦p(w)+d(b1)

This is because potential p(v) was selected during the preceding search in which node v was found, and therefore, p(v)≦p(w) stands. Accordingly, during a route determination performed for node w, selection of link b1 connecting node v and node w is not required. This also means that the permanent label (1, p(v)) of node v will not change. Thus, the potential p(v) is proved to be lowest.

Next, node u2 is considered. Node u2 has already been labeled with (a2, p(v)+d(a2)).

The potential value of this label is compared with that of a new label (b2, p(w)+d(b2)).

If p(v)+d(a2)≦p(w)+d(b2), the label of node u2 remains unchanged and the following label is maintained.

u2: (a2, p(v)+d(a2))

If p(v)+d(a2)>p(w)+d(b2), node u2 is labeled with the following temporary label.

u2: (b2, p(w)+d(b2))

Accordingly, through replacement of temporary labels, the route which produces the lowest potential is set.

As is understood from the above description, the corresponding lowest potential value is set into each permanent label, and presence of a temporary label represents the possibility of another route reducing the potential further.

The following programming technique is used to start route determination from a start node 0. That is, during initial value setting, start node 0 is labeled with a temporary label (*, 0), and each of the remaining nodes is labeled with a temporary label (Φ, ∞).

Therefore, in order to judge whether searching of a minimum-cost route including walking sections is ended, the computer checks whether "a node corresponding to the target location has been labeled with a permanent label." The above-described operation can be performed by means of a program comprising the following steps.

Step 1 (Process for Setting Initial Values):

The start node is labeled with a temporary label (*, 0), and each of the remaining nodes is labeled with a temporary label (Φ, ∞).

Step 2 (Process for Searching the Node of the Lowest Potential):

Among nodes each bearing a temporary label, a node of lowest potential is searched and is regarded the lowest potential node v. When the searched node is a node corresponding to the target location, the processing proceeds to step S4 (End process). In other cases, the processing proceeds to step S3 (Route determination process).

Step 3 (Route Determination Process):

When node δa adjacent to node v is connected to node v via link a, and a cost d(δa) is involved in link a, the potential of node δa is p(v)+d(a). In the case in which a potential p(δa) has already been set to node ba, when p(v)+d(a)<p(δa), p(v)+d(a) is regarded a new potential p(δa) in order to create a temporary label (a, p(δa)). Subsequently, the temporary label of node v is rendered permanent. Subsequently, the processing returns to step 2 (Process for searching the node of lowest potential).

Step 4 (End Process)

Permanent labels are followed backward from node v in order to output the route in a demanded form.

Figure 4:
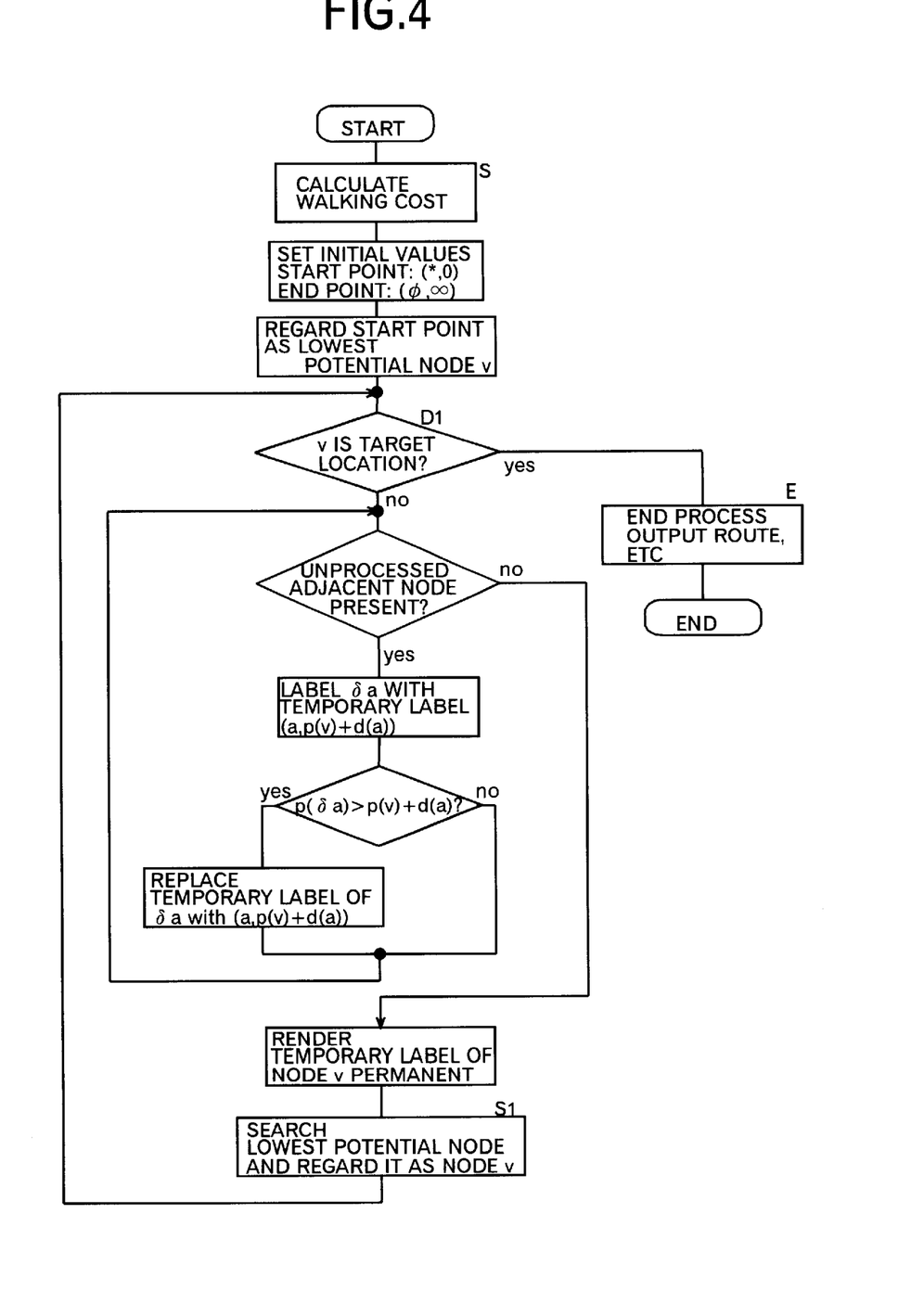
FIG. 4 is a flowchart in relation to the embodiment of the present invention, showing processing for determining a route from a start location to a target location under the condition of attaining minimum cost.

FIG. 4 is a flowchart showing the above-described processing. The portion of processing other than process S "walking cost calculation" in FIG. 4 corresponds to the "potential-basis label determination method." In FIG. 4, p(δa) represents a potential already set for node δa. When potential p(δa) is greater than a newly calculated potential p(v)+d(a), p(δa) in the label is replaced with p(v)+d(a).

Further, the link name in the label is replaced with "a," and node δa is labeled with a new temporary label (a, δa).

When an adjacent node is searched, search operation is performed only for outgoing links. Since the flowchart of FIG. 4 has a "DO WHILE" configuration, labeling of node v with a permanent label is performed in the end process in which the lowest potential node is searched and regarded node v. That is, in the above description, the labeling operation is described as being performed in step 2. However, in the flowchart, the labeling operation is incorporated in the processing in step 3. This is merely a matter in relation to programming, and no fundamental difference in concept is present therebetween.

The processing shown in FIG. 4 is common between the first and second aspect of the present invention. Therefore, when actual processing is performed in accordance with the first aspect of the present invention, "straight-line-distance-basis walking cost calculation" is performed as the "calculation of walking cost," and when actual processing is performed in accordance with the second aspect of the present invention, "road-map-basis walking cost calculation" is performed as the "calculation of walking cost." The details of these calculations will be described in the "Embodiments of the Invention" section.

Figure 5:
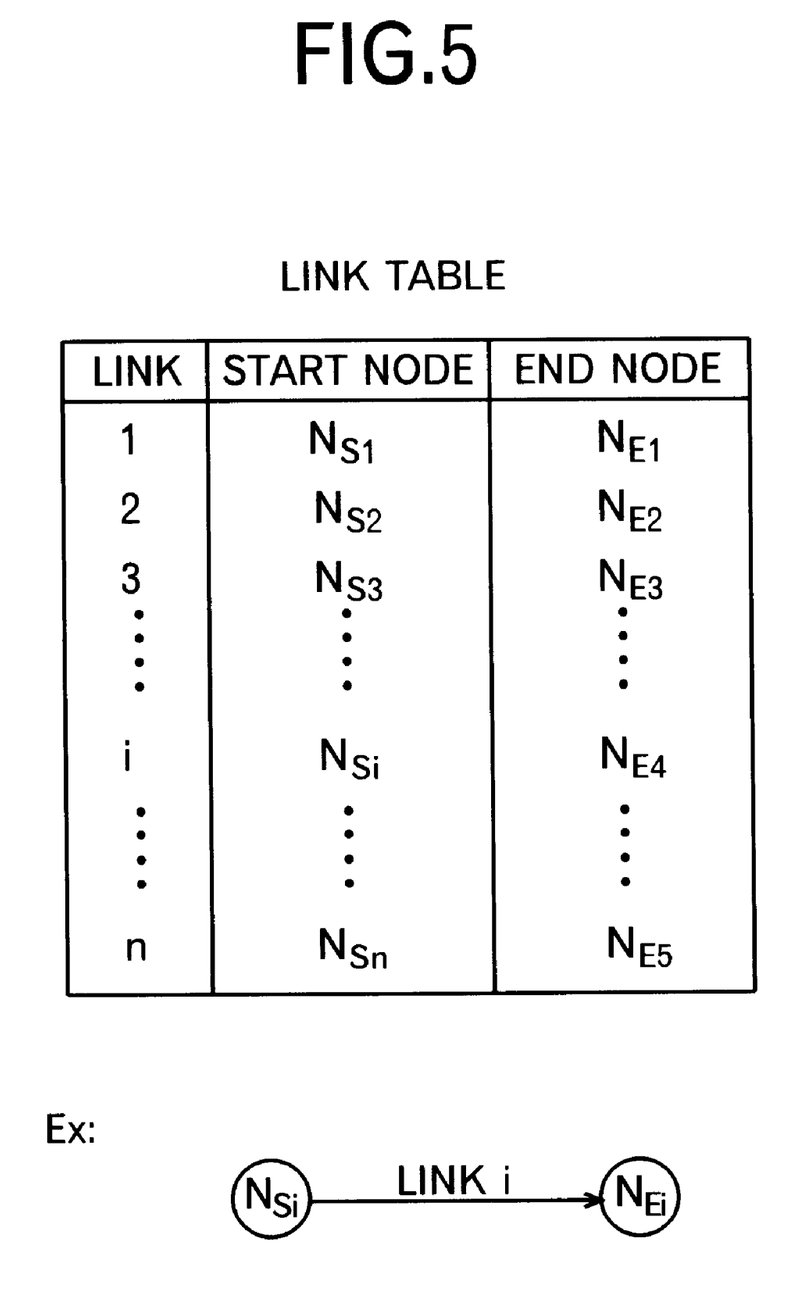
FIG. 5 is a diagram in relation to the embodiment of the present invention, showing a link table.

In the above-described route determination, the link table as shown in FIG. 5 is created. Therefore, through an operation of following nodes backward from the target location with reference to the link table as shown in FIG. 5 and link names set in permanent labels, a minimum-cost route extending from the start location to the target location bearing a permanent label can be found.

DESCRIPTION OF THE PREFERRED EMBODIMENTS

Embodiments of the present invention will be described with reference to the drawings.

Figure 6:
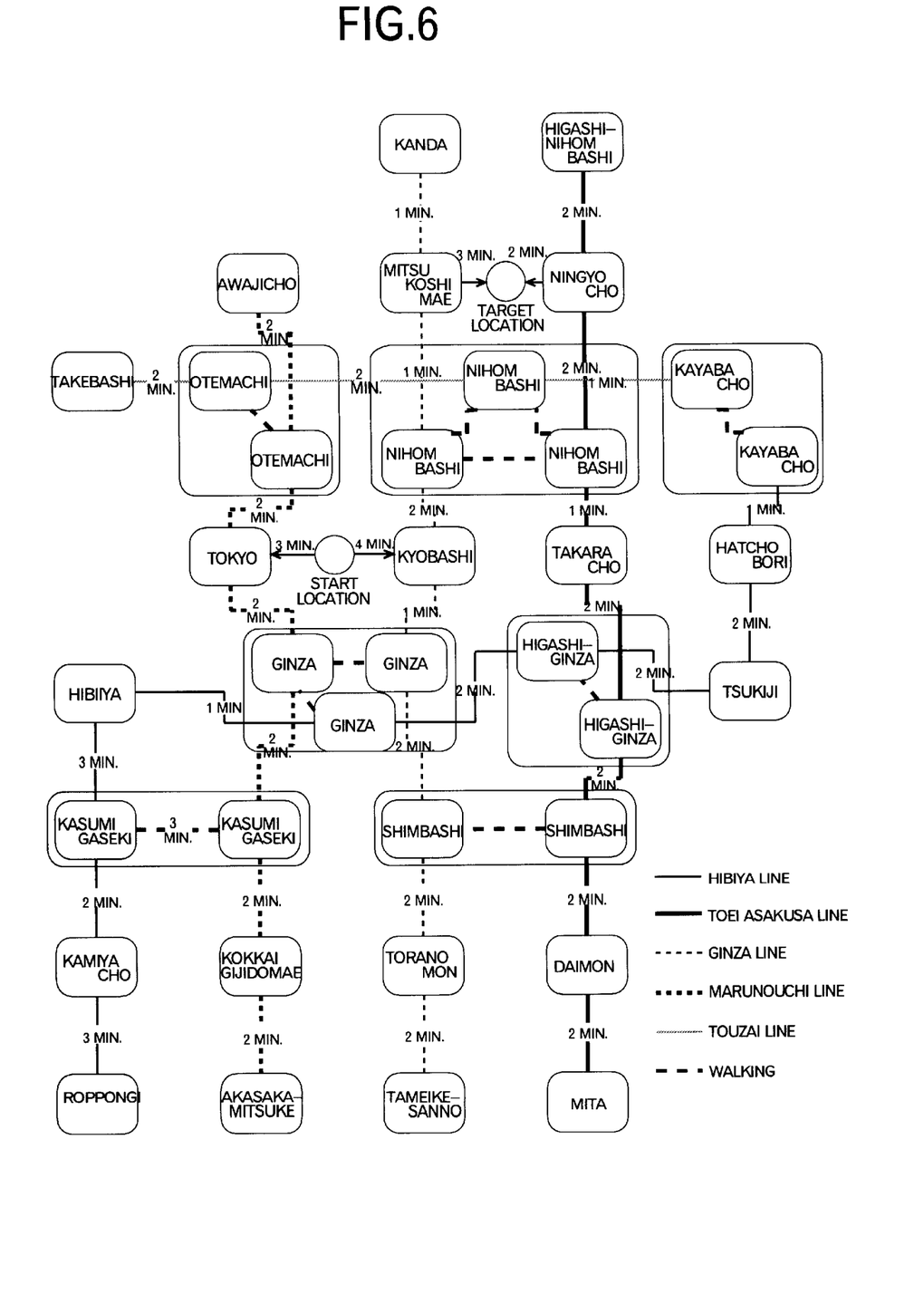
FIG. 6 is a diagram in relation to the embodiment of the present invention, showing subway lines used in an example in which candidate stations are searched on the basis of straight-line distance.

In the embodiments, a minimum-cost route Is determined by use of a subway map shown in FIG. 6 under the assumption that a start location is located in the vicinity of Tokyo, Kobashi, and Ginza stations, and a target location is located between Mitsukoshimae and Ningyocho stations. In embodiment 1, entrance and exit stations are searched on the basis of straight-line distance, and in embodiment 2, entrance and exit stations are searched on the basis of a road map. In either case, stations within 10 minutes' walking are searched as candidate entrance and exit stations. In an actual program for route determination, a user is requested to designate start and target locations by use of specific location names. The latitude and longitude of each location are derived from map data which are provided in advance. For simplification, the flowing description is based on the assumption that a time for awaiting a train is zero, and each change of subway lines (indicated by broken lines) requires 3 minutes' walking. Further, in the embodiments, time determines cost . That is, a route which minimizes a required time is searched. Therefore, the unit of potential which will be discussed below Is time.

Embodiment 1

First, "straight-line-distance-basis walking cost calculation" will be described. When position data obtained from map data are coordinates in a normal coordinate system (orthogonal coordinate system), a maximum walking time (10 min) is multiplied by an average walking speed in order to determine a search area. When the average walking speed is 4 km/h, stations located within a circular area which has a radius of about 700 mm and is centered at a start location or a target location are selected. The thus-searched stations are regarded candidate stations to be used. In the case in which location data obtained from map data are latitude/longitude data, a distance S between a candidate station and a start or target location is obtained by use of equations (1) and (2) described in the "SUMMARY OF THE INVENTION" section. That is, when the latitude and longitude of the start location is represented by ($\phi1$, $\lambda1$), and the latitude and longitude of the target location is represented by ($\phi2$, $\lambda2$), the straight-line distance S can be calculated as follows.

$$\cos \xi = \sin \phi1 \cdot \sin \phi2 + \cos \phi1 \cdot \cos \phi2 \cdot (\cos(\lambda1-\lambda2)) \quad S = R \cdot \xi$$

Therefore, stations which satisfy $S \leq 700$ are incorporated in the route map as nodes to be linked to the start location or the target location. The cost of a link between a certain station and the start location or the target location is a value obtained through division of the straight-line distance S by the average walking speed. In the example shown in FIG. 6, the cost of a link between the start location and Kyobashi Station is obtained as 4 minutes, and the cost of a link between the start location and Tokyo Station is obtained as 3 minutes. Further, the cost of a link between the target location and Ningyocho Station is obtained as 2 minutes, and the cost of a link between the target location and Mitsukoshimae Station is obtained as 3 minutes. These values are incorporated into a link table shown in FIG. 5. Subsequently, the following route determination is performed.

(Initial Setting)

During initial value setting, a node corresponding to the start location is labeled with a temporary label (*, 0 min.), and each of other nodes corresponding to stations is labeled with a temporary label ($\Phi$, $\infty$), where "*" means that no link reaches the start node, "$\Phi$" means that no link has yet reached the corresponding node, and "$\infty$" means a numerical value sufficiently large within the context of a relevant problem. In the initial state, the node corresponding to the start location is regarded node v.

(Processing in First Loop)

Among nodes corresponding to stations and bearing temporary labels, a node or nodes of lowest potential are searched. In this case, nodes corresponding to Tokyo Station and Kyobashi Station are linked to node v. Since these end nodes are both unsearched nodes, the potential of each end node is a cumulative time as measured from the start location. Therefore, the nodes corresponding to Tokyo and Kyobashi Stations are labeled with the following temporary labels.

Tokyo Sta., Marunouchi Line.: (start location, 3 min.)

Kyobashi Sta., Ginza Line.: (start location, 4 min.)

Further, the node corresponding to the start location is labeled with the following permanent label.

Starting location: (*, 0 min.)

Subsequently, among nodes bearing temporary labels, a node or nodes of lowest potential are searched. At this time, a node corresponding to Tokyo Station on the Marunouchi Line has the lowest potential (3 min.); this node is regarded node v.

(Processing in Second Loop)

Since node v at this point is not the target location, the processing is continued.

Links extending from the node v corresponding to Tokyo Station on the Marunouchi Line reach a node corresponding to Otemachi Station on the Marunouchi Line and a node corresponding to Ginza Station on the Marunouchi Line, each having a potential 3+2; i.e., 5 minutes. The thus-searched new nodes are labeled with temporary labels, and the node corresponding to Tokyo station is labeled with a permanent label. Accordingly, at the present point, the following temporary labels are present.

Otemachi Sta., Marunouchi Line: (Tokyo Sta., Marunouchi Line→Marunouchi Line, 5 min.)
Ginza Sta., Marunouchi Line: (Tokyo Sta., Marunouchi Line→Marunouchi Line, 5 min.)
Kyobashi Sta., Ginza Line: (start location, 4 min.)

Further, the following permanent labels are present.

Starting point: (*, 0 min.)
Tokyo Sta., Marunouchi Line: (start location, 3 min.)

Upon searching of a node or nodes of lowest potential among nodes bearing temporary labels, a node corresponding to Kyobashi Station on the Ginza Line is found, because of the presence of the label Kyobashi Sta., Ginza Line: (start location, 4 min.), and the node corresponding to Kyobashi Station is regarded node v.

(Processing in Third Loop)

Since node v at this point is not the target location, the processing is continued.

Links extending from the node v corresponding to Kyobashi Station on the Ginza Line reach a node corresponding to Ginza Station on the Ginza Line and a node corresponding to Nihombashi Station on the Ginza Line. In this case, the node corresponding to Ginza Station has a potential 4+1; i.e., 5 minutes, and the node corresponding to Nihombashi Station has a potential 4+2; i.e., 6 minutes. The thus-searched new nodes are labeled with temporary labels, and the node corresponding to Kyobashi Station on the Ginza Line is labeled with a permanent label. Accordingly, at the present point, the following temporary labels are present.

Otemachi Sta., Marunouchi Line: (Tokyo Sta., Marunouchi Line→Marunouchi Line, 5 min.)
Ginza Sta., Marunouchi Line: (Tokyo Sta., Marunouchi Line→Marunouchi Line, 5 min.)
Ginza Sta., Ginza Line: (Kyobashi Sta., Ginza Line→Ginza Line, 5 min.)
Nihombashi Sta., Ginza Line: (Kyobashi Sta., Ginza Line→Ginza Line, 6 min.)

Further, the following permanent labels are present.

Starting point: (*, 0 min.)
Tokyo Sta., Marunouchi Line: (start location, 3 min.)
Kyobashi Sta., Ginza Line: (start location, 4 min.).

Subsequently, among nodes bearing temporary labels, a node or nodes of lowest potential are searched. In this case, three candidates (5 minutes) are found. Here, the node corresponding to Tokyo Station on the Marunouchi Line is regarded node v.

When the above-described processing is continued until node v reaches the target location, the following permanent labels are obtained.

Starting point: (*, 0 min.)
Tokyo Sta., Marunouchi Line: (start location, 3 min.)
Kyobashi Sta., Ginza Line: (start location, 4 min.)
Otemachi Sta., Marunouchi Line: (Tokyo Sta., Marunouchi Line→Marunouchi Line, 5 min.)
Ginza Sta., Marunouchi Line: (Tokyo Sta., Marunouchi Line→Marunouchi Line, 5 min.)
Ginza Sta., Ginza Line: (Kyobashi Sta., Ginza Line→Ginza Line, 5 min.)
Nihombashi Sta., Ginza Line: (Kyobashi Sta., Ginza Line→Ginza Line, 6 min.)
Awajicho Sta., Marunouchi Line: (Otemachi Sta., Marunouchi Line→Marunouchi Line, 7 min.)
Kasumigaseki Sta., Marunouchi Line: (Ginza Sta., Marunouchi Line→Marunouchi Line, 7 min.)
Shimbashi Sta., Ginza Line: (Ginza Sta., Ginza Line→Ginza Line, 7 min.)
Mitsukohimae Sta., Ginza Line: (Nihombashi Sta., Ginza Line→Ginza Line, 7 min.)
Ginza Sta., Hibiya Line: (Ginza Sta., Marunouchi Line→walking, 8 min.)
Otemachi Sta., Hiblya Line: (Otemachi Sta., Hibiya Line→walking, 8 min.)
Kandabashi Sta., Ginza Line: (Mitsukoshimae Sta., Ginza Line→Ginza Line, 8 min.)
Nihombashi Sta., Hibiya Line: (Nihombashi Sta., Ginza Line→walking, 9 min.)
Nihombashi Sta., Toei Asakusa Line: (Nihombashi Sta., Ginza Line→walking, 9 min.)
Hibiya Sta., Hiblya Line: (Ginza Sta. Hibiya Line→Hibiya Line, 9 min .)
Takaracho Sta., Toel Asakusa Line: (Nihombashi Sta., Toei Asakusa Line→Toei Asakusa Line, 10 min.)
Higashi-Ginza Sta., Hibiya Line: (Ginza Sta., Hibiya Line→Hibiya Line, 10 min.)
Kasumigaseki Sta., Hibiya Line: (Kasumigaseki Sta., Marunouchi Line→walking, 10 min.)
Shimbashi Sta., Toei Asakusa Line: (Shimbashi Sta., Ginza Line→walking, 10 min.)
Takebashi Sta., Hibiya Line: (Otemachi Sta., Hibiya Line→Otemachi, 10 min.)
Target location: (Mitsukoshimae Sta., Ginza Line→walking, 10 min.)

Accordingly, it will take 10 minutes to reach the target location. The minimum-cost route from the start location to the target location can be obtained by following the permanent labels backward from the target location. In the flowchart shown in FIG. 4, the arrival at the final "target location: (Mitsukoshimae Sta., Ginza Line→walking, 10 min.)" can be detected by the operation of labeling the node v corresponding to the target location with a permanent label during the end process.

Since the label of the target location is "target location: (Mitsukoshimae Sta., Ginza Line→walking, 10 min.)," a link which has first reached the target location is "Mitsukoshimae Sta., Ginza Line→walking." Subsequent checking of the label of the node corresponding to Mitsukoshimae Sta., Ginza Line reveals that the label is (Nihombashi Sta., Ginza Line→Ginza Line, 7 min.). Thus, it is found that the route is determined to proceed from Nihombashi Station to Mitsukoshimae Station on the Ginza Line. In a similar manner, the permanent labels are followed backward to the start location bearing the label (*, 0 mi.). Thus, the minimum-cost route is determined. In this case, the minimum-cost route is determined as follows.

Start location→Kyobashi Sta., Ginza Line→Nihombashi Sta., Ginza Line→Mitsukoshimae Sta., Ginza Line →Target location Embodiment 2

Figure 7:
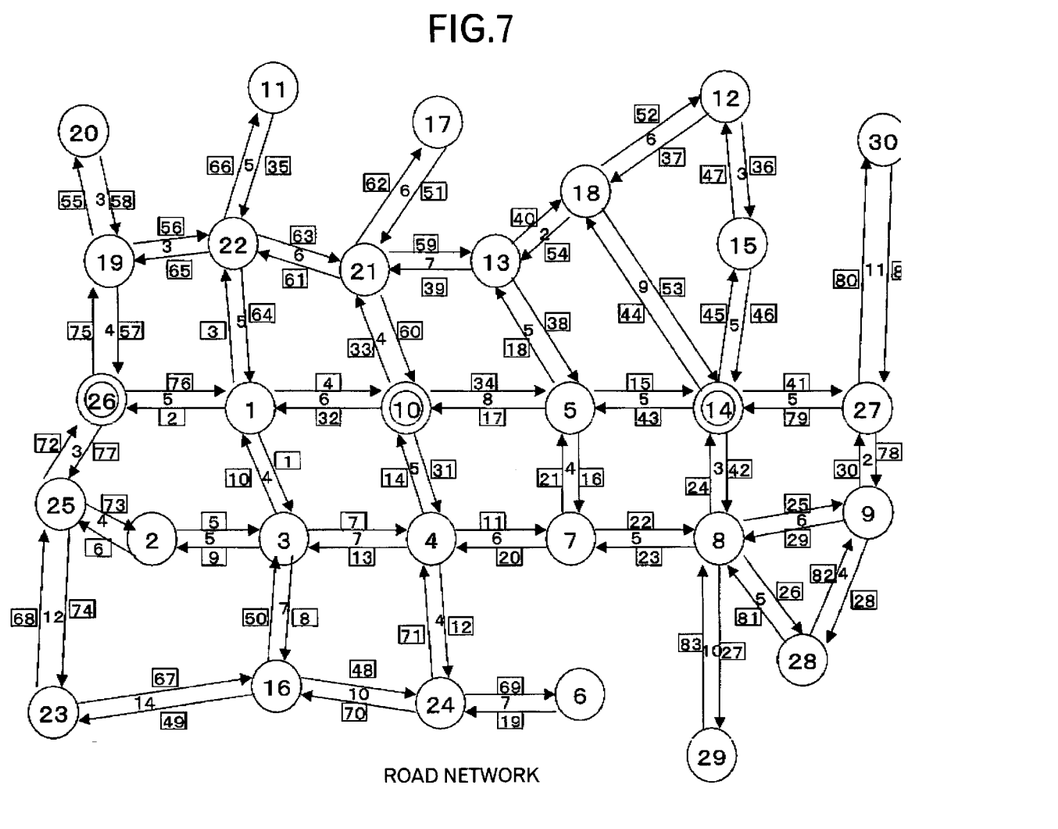
FIG. 7 is a diagram in relation to the embodiment of the present invention, showing a road network used in an example in which candidate stations are searched on the basis of a road map.

In the present embodiment, a walking section is determined through "road-map-basis walking cost calculation." As In Embodiment 1, a transportation network map shown In FIG. 6 is used. Therefore, the present embodiment differs from Embodiment i only in the manner of determining a link from the start location to an entrance station or from an exit station to the target location. In the present embodiment, walking cost is calculated by use of a road network shown in FIG. 7. In FIG. 7, each intersection (node) is denoted by a circle; and each road branch (link) is denoted by an arrow (→). A numeral in each circle denotes a corresponding node number, and a numeral in each square denotes a corresponding link number. Further, a bare numeral attached to each link denotes corresponding cost, and the unit thereof is minute (time).

Basically, the "potential-basis label determination method" shown in FIG. 4 can be used for "road-map-basis walking cost calculation." However, in this case, the cost of a determined link between a certain station and the start or target location must fall within a designated cost range. Therefore, when "road-map-basis walking cost calculation" is performed in accordance with the flowchart of FIG. 4, the judgment step D1 in the flowchart of FIG. 4 must be modified as follows:

$p(v) > P$ where $p(v)$ is the potential of node v, and P is the cost designated for the walking sections. Further, in the end process E, processing is performed in order to incorporate stations bearing permanent labels into the subway network as candidate entrance stations or candidate exit stations. Of course, the "calculation of walking cost" in first step S is unnecessary.

When the program modified in the above-described manner is executed, a plurality of stations bearing permanent labels are obtained, and links connecting the start location and candidate entrance stations and links connecting candidate exit stations and the target location are incorporated into the link table shown in FIG. 5. In an example case in which the start location is node 10 in the road network (denoted by a double circle in FIG. 7), the following candidate entrance stations are searched:

Tokyo Sta., Marunouchi Line 26 (route: 10→1→26, cost: 11 min.)

Kyobashi Sta., Ginza Line 14 (route: 10→5→14, cost: 13 min.)

Each of the thus-searched routes is incorporated into the subway network as a single link. That is, the following links are incorporated.

Start location→Tokyo Sta., Marunouchi Line L1, cost: 11 min.

Start location→Kyobashi Sta., Ginza Line L2, cost: 13 min.)

Here, L1 and L2 each represent a link number, which is not used in the link table.

Determination of routes from candidate exit stations to the target location is performed in the same manner as that for routes from the start location to candidate entrance stations. Although the route determination for entrance stations is performed for outgoing links, in the route determination for exit stations, only incoming links are subjected to searching operation, which is performed backward from the target location. However, unlike the case of driving, walking is not affected very much by one-way streets, traffic signals, or traffic jams. Therefore, no problem arises even when cost of an outgoing link is considered to be the same as that of an incoming link. After the thus-determined new links are incorporated into the subway network, route determination is performed by the "potential-basis label determination method" as in Embodiment 1.

EFFECTS OF THE INVENTION

Presently, each major city has a developed traffic network. Especially, subway networks are as complicated as a spider's web. When a person utilizes a subway, the person frequently walks from a start location to an entrance station and from an exit station to a target location. However, conventional systems determine a route between designated entrance and exit stations, while ignoring the sections in which the person walks. Therefore, such systems have a drawback in that even when the person designates stations closest to the start and target locations as entrance and exit stations, a determined route is not guaranteed to minimize cost when the walking sections are taken into consideration. By contrast, in the present invention, a minimum-cost route can be determined reliably, because the start and target locations are directly designated, and a route including walking sections is determined. Accordingly, in route determination according to the present invention, a searched entrance or exit station is not necessary the closest station (station closest to the start or target location). However, it is guaranteed that the total cost (generally, time), including that incurred in walking sections, is minimized. A person may perform route determination for determining a minimum-cost route, while designating closest stations, within an area familiar to the person. The present invention is effective when such route determination is performed in an area which is unfamiliar to the person. In addition, since the user can directly designate start and target locations, as opposed to entrance and exit stations, designation operation is simple, total cost can be calculated more accurately.

We often encounter a situation in which a person asks us "Which station is the most convenient from here?" The present invention eliminates the necessity of such a question, because the user can designate start and target locations between which walking sections are present. Further, the present invention can cope with a demand for searching a closest station (on foot). In this case, the "road-map-basis walking cost calculation" is performed independent of other calculations in order to search a station of lowest potential. Thus, the closest station can be searched with ease. The present invention provides such flexibility.

Figure 8:
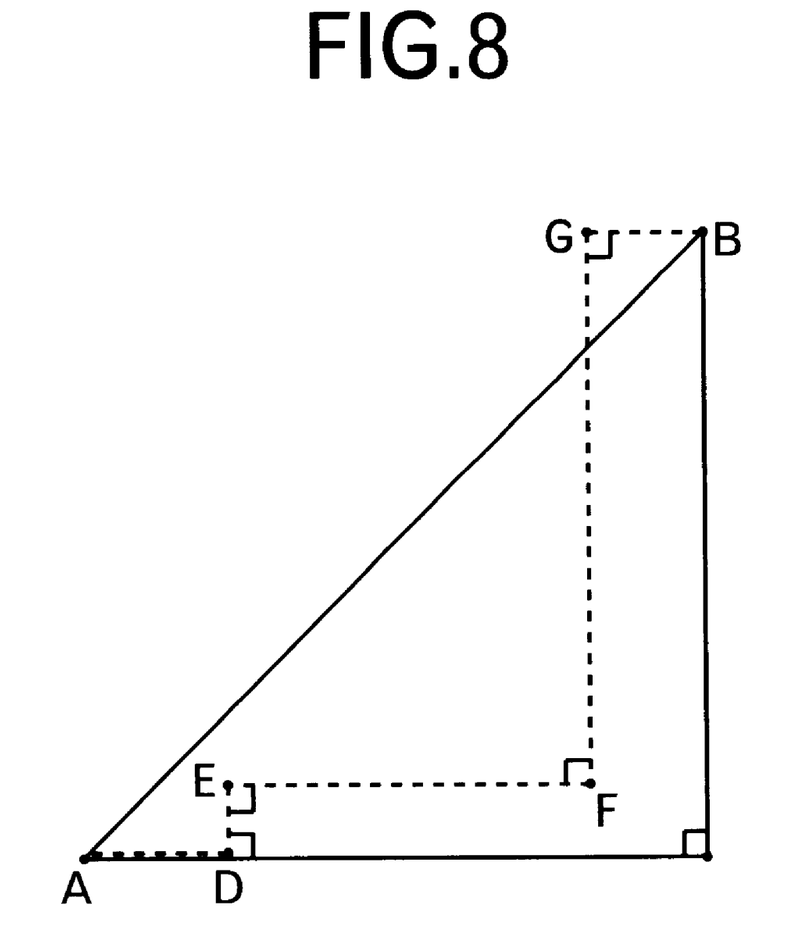
FIG. 8 is a diagram which is used to supplementally describe, in relation to effects of the invention, another method of searching candidate stations on the basis of straight-line distance.

In the present invention, two methods are proposed in order to determine candidate entrance stations and candidate exit stations. In the method in which the "straight-line-distance-basis walking cost calculation" is employed, candidate entrance stations and candidate exit stations are selected on the assumption that cost of each walking section is proportional to the straight-line distance between the start and end point of the section. In general, in a major city, roads intersect perpendicularly, and there is a possibly that at worst an error corresponding to the straight-line distance x $\sqrt{2}$ (approximately 1.4) is produced. For example, when the maximum walking cost is designated to be 10 minutes, candidates stations which require up to about 14 minutes may be extracted. In some cases, this point must be taken into consideration when programming a route determination program. In an exemplary case shown in FIG. 8, in which a person walks from point A to point B along a route A→D→E→F→G→B, which forces the person to make a right-angle turn at each intermediate point, the distance (or cost) of the route can be obtained more accurately through calculation of a sum of the lengths of two sides of a right triangle ABC, or AC+CB. However, even when such calculation is not employed, the features of the present invention; i.e., simplifying programming and enabling processing to be completed within a shortened period of time, are not eliminated. The important feature here is the capability of automatically determining a route including walking sections, without producing an unacceptable error.

Meanwhile, in order to calculate accurate walking cost, the "road-map-basis walking cost calculation" is employed in embodiment 2. Since the walking cost can be obtained through processing which is almost the same as that for the "potential-basis label determination method," portions common between a program for the calculation of walking cost and a program for the label determination method can be programmed in the form of subroutines, which prevents a considerable increase in the size of the programs. Although the "road-map-basis walking cost calculation" requires a longer processing time as compared with the "straight-line-distance-basis walking cost calculation," the former is more advantageous in that the former can calculate walking cost accurately and can provide a user with a detailed route within each walking section.

What is claimed is:

1. A method of determining, by use of a computer, a route from a start location to a target location within a traffic network, in which locations are represented as nodes and a route between adjacent nodes is represented as a link, the determination being performed in accordance with a label determination method under the conditions of minimum cost, while travel time or travel distance is evaluated as cost, the method comprising:

(1) choosing at least one entrance station of a transportation network to be used whose straight-line distance as measured from the start location falls within a predetermined range and at least one exit station of the transportation network whose straight-line distance as measured from the target location falls within the predetermined range, and estimating cost of a walking route from the start location to the entrance station and cost of a walking route from the exit station to the target location, on the basis of the respective straight-line distances, each calculated by use of latitude/longitude data; and (2) incorporating, as links, the walking routes having estimated costs into a traffic network comprising the transportation network in order to express a comprehensive traffic network to thereby enable the computer to determine a route under desired cost conditions in accordance with the label determination method.

2. A method of determining a minimum-cost route according to claim 1, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label ($\Phi$, $\infty$) during initial value setting, where "*" means that no link reaches the start node, "$\Phi$" means that no link has yet reached the corresponding node, and "$\infty$" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

3. A system for determining, by use of a computer, a route from a start location to a target location within a traffic network, in which locations are represented as nodes and a route between adjacent nodes is represented as a link, the determination being performed in accordance with a label determination method under the conditions of minimum cost, while travel time or travel distance is evaluated as cost, the system comprising:

(1) means for choosing at least one entrance station of a transportation network to be used whose straight-line distance as measured from the start location falls within a predetermined range and at least one exit station of the transportation network whose straight-line distance as measured from the target location falls within the predetermined range, and for estimating cost of a walking route from the start location to the entrance station and cost of a walking route from the exit station to the target location, on the basis of the respective straight-line distances, each calculated by use of latitude/longitude data; and (2) means for incorporating, as links, the walking routes having estimated costs into a traffic network comprising the transportation network in order to express a comprehensive traffic network to thereby enable the computer to determine a route under desired cost conditions in accordance with the label determination method.

4. A system for determining a minimum-cost route according to claim 3, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label ($\Phi$, $\infty$) during initial value setting, where "*" means that no link reaches the start node, "$\Phi$" means that no link has yet reached the corresponding node, and "$\infty$" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

5. A computer readable record medium storing therein a program for determining, by use of a computer, a route from a start location to a target location within a traffic network, in which locations are represented as nodes and a route between adjacent nodes is represented as a link, the determination being performed in accordance with a label determination method under the conditions of minimum cost, while travel time or travel distance is evaluated as cost, the program comprising:

(1) processing for choosing at least one entrance station of a transportation network to be used whose straight-line distance as measured from the start location falls within a predetermined range and at least one exit station of the transportation network whose straight-line distance as measured from the target location falls within the predetermined range, and for estimating cost of a walking route from the start location to the entrance station and cost of a walking route from the exit station to the target location, on the basis of the respective straight-line distances, each calculated by use of latitude/longitude data; and (2) processing for incorporating, as links, the walking routes having estimated cost into a traffic network comprising the transportation network in order to express a comprehensive traffic network to thereby enable the computer to determine a route under desired cost conditions in accordance with the label determination method.

6. A computer readable record medium according to claim 5, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label (Φ, ∞) during initial value setting, where "*" means that no link reaches the start node, "Φ" means that no link has yet reached the corresponding node, and "∞" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

7. A method of determining, by use of a computer, a route from a start location to a target location within a traffic network, in which traffic network locations are represented as nodes and a route between adjacent nodes is represented as a link, the determination being performed in accordance with a label determination method under the conditions of minimum cost, while travel time or travel distance is evaluated as cost, the method comprising:

(1) calculating cost of a walking route from the start location to at least one entrance station of a transportation network to be used and cost of a walking route from at least one exit station of the transportation network to the target location, the cost involved in each of the walking routes falling within a designated cost range, and the walking routes being determined by a label determination method which utilizes a road network created from map data including latitude/longitude information and which determines the walking routes under desired cost conditions; and (2) incorporating, as links, the walking routes having calculated costs into a traffic network comprising the transportation network in order to express a comprehensive traffic network to thereby enable the computer to determine a route under desired cost conditions in accordance with the label determination method.

8. A method of determining a minimum-cost route according to claim 7, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label (Φ, ∞) during initial value setting, where "*" means that no link reaches the start node, "Φ" means that no link has yet reached the corresponding node, and "∞" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

9. A system of determining, by use of a computer, a route from a start location to a target location within a traffic network, in which locations are represented as nodes and a route between adjacent nodes is represented as a link, the determination being performed in accordance with a label determination method under the conditions of minimum cost, while travel time or travel distance is evaluated as cost, the system comprising:

(1) means for calculating cost of a walking route from the start location to at least one entrance station of a transportation network to be used and cost of a walking route from at least one exit station of the transportation network to the target location, the cost involved in each of the walking routes falling within a designated cost range, and the walking routes being determined by a label determination method which utilizes a road network created from map data including latitude/longitude information and which determines the walking routes under desired cost conditions; and (2) means for incorporating, as links, the walking routes having calculated costs into a traffic network comprising the transportation network in order to express a comprehensive traffic network to thereby enable the computer to determine a route under desired cost conditions in accordance with the label determination method.

10. A system for determining a minimum-cost route according to claim 9, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label ($\Phi$, $\infty$) during initial value setting, where "*" means that no link reaches the start node, "$\Phi$" means that no link has yet reached the corresponding node, and "$\infty$" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

11. A computer readable record medium storing therein a program for determining, by use of a computer, a route from a start location to a target location within a traffic network, in which locations are represented as nodes and a route between adjacent nodes is represented as a link, the determination being performed in accordance with a label determination method under the conditions of minimum cost, while travel time or travel distance is evaluated as cost, the program comprising:

(1) processing for calculating cost of a walking route from the start location to at least one entrance station of a transportation network to be used and cost of a walking route from at least one exit station of the transportation network to the target location, the cost involved in each of the walking routes falling within a designated cost range, and the walking routes being determined by a label determination method which utilizes a road network created from map data including latitude/longitude information and which determines the walking routes under desired cost conditions; and (2) processing for incorporating, as links, the walking routes having calculated costs into a traffic network comprising the transportation network in order to express a comprehensive traffic network to thereby enable the computer to determine a route under desired cost conditions in accordance with the label determination method.

12. A computer readable record medium according to claim 11, wherein the label determination method uses labels each consisting of the name of a link connecting a start node and a specific node and a cumulative cost from the start node to the specific node, and comprises:

processing routine (1) in which the start node is labeled with a temporary label (*, 0), and each of the remaining nodes is labeled with a temporary label ($\Phi$, $\infty$) during initial value setting, where "*" means that no link reaches the start node, "$\Phi$" means that no link has yet reached the corresponding node, and "$\infty$" means a numerical value which is sufficiently large within the context of a relevant problem;

processing routine (2) in which among nodes bearing temporary labels, a node having the lowest potential is selected, when the selected node is the target location, the route determination being ended, and processing routine (4) being performed, and when the selected node is not the target location, processing routine (3) being performed successively;

processing routine (3) in which the potential of an end node which is linked from the node having the lowest potential and which has a temporary label is calculated, when the thus-calculated potential of the end node is lower than the potential indicated by the temporary label of the end node, the potential indicated by the temporary label of the end node being replaced with the calculated potential of the end node, the temporary label of the node having the lowest potential being rendered permanent, and the processing routine (2) being executed; and processing routine (4) in which permanent labels are followed backward from the target location to the start location in order to determine a route of lowest potential, including walking routes.

* * * * *